(12) United States Patent
Soraru' et al.

(10) Patent No.: US 7,371,340 B2
(45) Date of Patent: May 13, 2008

(54) METHOD FOR PRODUCING SILICON OXYCARBIDE FIBERS

(75) Inventors: Gian Domenico Soraru', Povo (IT); Sandra Dire', Pergine Valsugana (IT); Alberto Berlinghieri, Bolzano (IT)

(73) Assignee: Universita' Degle Studi Di Trento, Trento (IT)

( * ) Notice: Subject to any disclaimer, the term of this patent is extended or adjusted under 35 U.S.C. 154(b) by 576 days.

(21) Appl. No.: 10/682,858

(22) Filed: Oct. 14, 2003

(65) Prior Publication Data

US 2004/0087431 A1 May 6, 2004

(30) Foreign Application Priority Data

Oct. 11, 2002 (IT) ............................ TO2002A0887

(51) Int. Cl.
*C04B 33/32* (2006.01)
*B28B 1/00* (2006.01)
(52) U.S. Cl. ........................................ 264/85; 264/86
(58) Field of Classification Search ............ 264/84–86
See application file for complete search history.

(56) References Cited

U.S. PATENT DOCUMENTS

| 5,167,881 A | * | 12/1992 | Atwell et al. ............... 264/433 |
| 5,358,674 A | | 10/1994 | Rabe |
| 5,629,249 A | * | 5/1997 | Leung ......................... 501/87 |

FOREIGN PATENT DOCUMENTS

IT          01 248 657          5/1990

* cited by examiner

*Primary Examiner*—Carlos Lopez
(74) *Attorney, Agent, or Firm*—Sughrue Mion, PLLC

(57) ABSTRACT

The present invention relates to a method for producing silicon oxycarbide fibers by pyrolysis of preceramic precursors.

Said method comprises the following steps: spinning of a composition comprising a silicone polymer and a reticulating agent, chemical reticulation of the fibers and pyrolysis at a temperature between 800 and 1400° C. in non-oxidizing atmosphere.

Said method is characterized by the use of a polyorganohydrosiloxane as silicone polymer and by a reticulating agent that carries out reticulation by reacting with Si—H bonds of polyorganohydrosiloxane.

17 Claims, 8 Drawing Sheets

METHOD FOR PRODUCING SILICON OXYCARBIDE FIBERS

FIELD OF THE INVENTION

The present invention relates to a method for producing ceramic fibers of silicon oxycarbide —SiCO— by pyrolysis of pre-ceramic precursors.

BACKGROUND ART

Silicon oxycarbide is an amorphous ceramic material with a structure deriving from silica ($SiO_2$), in which bivalent oxygen atoms have been replaced by tetravalent carbon atoms.

Silicon oxycarbide in its glass or fiber form has better chemical, physical and mechanical properties than common silica glass or than silica-based glasses (such as soda-lime glass, borosilicate, aluminosilicate, etc.) and than silica glass fibers or silica-based glass fibers (such as soda-lime glass, borosilicate, aluminosilicate, etc.).

Silicon oxycarbide glasses and fibers are excellent for use in environments requiring high chemical resistance under strongly acid or basic pH conditions, resistance to devitrification and to decomposition in oxidizing or reducing atmospheres, high elastic modulus and high thermal stability.

A process for producing silicon oxycarbide glass was described in document IT-A-1,248,657 issued to General Electric Company. The method basically envisages pyrolysis at temperatures between 900 and 1600° C. in non-oxidizing atmosphere of previously reticulated methyl silicone resins. The methyl silicone resins used contain methyl groups bonded to silicon atoms and alternated bonds of silicon and oxygen atoms with a branched polymeric structure. The reticulation of these resins takes place by adding to a solution of said resin in a solvent, such as for instance toluene, a reticulating agent, such as gamma-aminopropyl-triethoxysilane. In particular, reticulation occurs when the hydroxyl units that are present in the resin combine so as to form a Si—O—Si bridge bond releasing water.

Known methods for producing silicon oxycarbide ceramic fibers starting from a silicone polymer comprise the following steps:

i) spinning of a composition comprising a silicone polymer and a reticulating agent;
ii) chemical reticulation of fibers obtained from step i);
iii) pyrolysis of reticulated fibers at a temperature of 800-1600° C. in non-oxidizing atmosphere.

A process for producing silicon oxycarbide fibers according to the method mentioned above is described in patent U.S. Pat. No. 5,358,674 belonging to Dow Corning Corporation. Fibers are produced starting from a composition comprising a basically linear polysiloxane consisting of [$R_2SiO$] units, in which R can be hydrogen or a saturated or unsaturated hydrocarbon radical, and a reticulating agent consisting of a photo-initiator. In this method it is essential that at least 20%, and preferably 50%, of said [$R_2SiO$] units contains at least an unsaturated hydrocarbon R (for instance [MeViSiO], where Me refers to a methyl group and Vi to a vinyl group). The composition is spun and then fibers are reticulated by irradiation with UV rays which activate the photo-initiator. The fibers thus reticulated undergo pyrolysis at a temperature between 800 and 1000° C. in non-oxidizing atmosphere (vacuum, argon, etc.).

The aforesaid document mentions the presence of Si—H bonds in the starting polysiloxane (when R is a hydrogen atom); the solution referred to identifies as an essential element of the invention the presence for reticulation of unsaturated bonds in R substituents of [$R_2SiO$] units constituting the polysiloxane, which bonds are activated by the photo-initiator.

These methods for producing silicon oxycarbide ceramic systems result in a product comprising a substantial portion of carbon atoms bonded to silicon atoms and a significant portion of carbon atoms as elementary carbon dispersed in the glass matrix.

There is therefore the need for technologies for producing silicon oxycarbide ceramic fibers, which are cheaper than known methods and can generate ceramic fibers with a given composition and structure, i.e. with quite a high number of carbon atoms having covalent bonds with silicon atoms, and with better mechanical, thermal and chemical properties than fibers obtained with production methods known in the field.

It has already been suggested to produce silicon oxycarbide ceramic fibers with better chemical properties than those known today, for instance with tensile strength up to 750 MPa and elastic modulus up to 125 GPa.

SUMMARY OF THE INVENTION

The present invention aims at providing a method enabling the production of such ceramic fibers with reproducibility and reliability features as required for industrial use.

According to the invention said aim is achieved by the solution specifically referred to in the appended claims.

The invention also relates to fibers obtained with said method.

Though without referring to any specific theory in a binding way, the Applicant has good reasons to think that the method according to the invention stresses the presence of Si—H bonds, which are important for giving the ceramic fibers unexpected mechanical, thermal and chemical resistance properties.

DESCRIPTION OF THE DRAWINGS

The invention will now be described in further detail to a mere non-limiting purpose, with reference to the accompanying drawings, where:

FIG. 1c shows an end of one of said pre-ceramic fibers.

FIGS. 2c and 2d show an end of one of said pyrolyzed fibers.

DESCRIPTION OF PREFERRED EMBODIMENTS OF THE INVENTION

Figure 1:
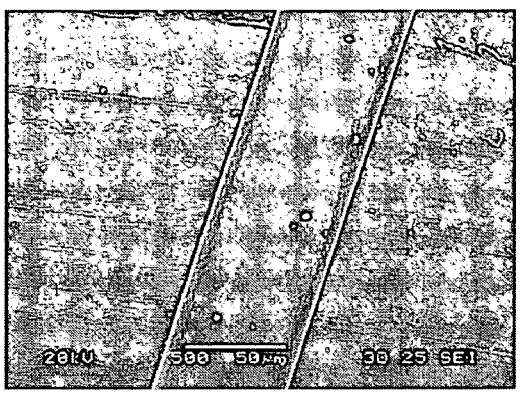
FIG. 1 shows three photographs obtained with a scanning electronic microscope (SEM), with different enlargements, of pre-ceramic fibers produced with the method described in Example 1 with a Ti/Si ratio of 0.05.
Figure 1:
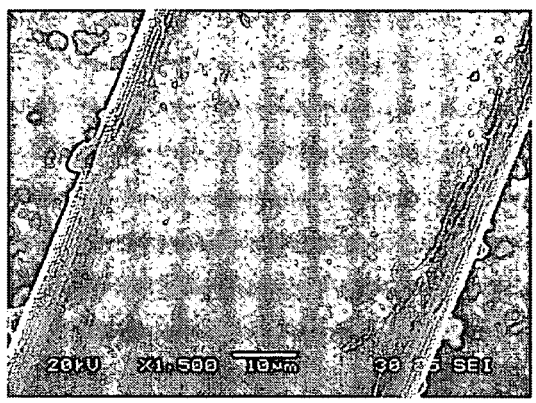
Figure 1:
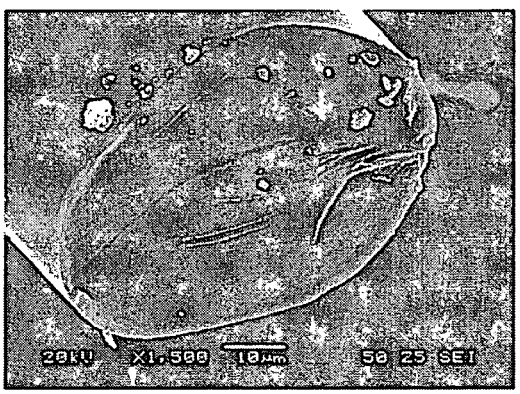

As was already said, the presence of Si—H groups in the starting silicone polymer is deemed to be important both during fiber reticulation and during pyrolysis, since it enables the insertion of carbon into the inorganic glass reticule and reduces the tendency to the formation of a phase based on elementary carbon.

In the presently preferred embodiment, the present method differs from methods known in the field because of the use as starting reagent of a polyorganohydrosiloxane, i.e. of a linear silicone polymer containing Si—H bonds, and as reticulating agent of a compound carrying out reticulation reacting specifically with Si—H bond.

The preferred use of said reticulating agent in the starting composition, comprising the silicone polymer and said reticulating agent, leads to the disappearance of the hydrogen atom from a part of Si—H groups present in the silicone polymer, with the formation of Si—O bonds resulting in a partial reticulation of the starting silicone polymer, i.e. generating a reticulated thermoplastic polymer also known as thermo-setting polymer.

In this step the reticulating agent induces an increase in the viscosity of the starting polymer, leading to a spinnable composition.

As soon as the fiber is formed and put in contact with the atmosphere, reticulation starts by solvent evaporation and possibly dissolution of water in form of steam; reticulation prevents the fiber from losing its shape.

The reticulation process for said polyorganohydrosiloxanes by means of said reticulating agents is probably similar to the process taking place during the reticulation of commercially available silicone compounds; unexpectedly, in this case said reticulation has an important role in determining physical, chemical and mechanical properties of ceramic fibers.

The following pyrolysis step comprises "ceramization" reactions which further increase fiber reticulation, until a ceramic phase is achieved. In particular, there is the formation of covalent Si—C bonds and the-quiet negligible—inclusion of elementary carbon atoms in the interstices of the glass polymer structure.

During pyrolysis the fibers comprising the reticulated thermoplastic polymer, also known as pre-ceramic precursor, thicken and release gases (mainly $CH_4$ and $H_2$) with reactions such as:

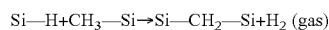

Si—H+$CH_3$—Si→Si—$CH_2$—Si+$H_2$ (gas)

and undergo a weight loss; pyrolysis is over when fibers do not lose weight anymore.

Preferred pyrolysis temperatures for silicone preceramic precursors are between 800 and 1400° C.; times for said reaction are around 1-5 hours.

Silicon oxycarbide fibers produced with the method according to the present invention have unexpected chemical, mechanical and thermal properties; in particular they show an excellent chemical resistance in strongly basic environments, up to pH 12, or in strongly acid environments, for instance they can resist the attack of hydrofluoric acid, which is known to attack silica glass.

These silicon oxycarbide fibers also have unexpected mechanical properties; as a matter of fact, they show an elastic modulus up to 180 GPa compared with values around 75-80 GPa of silica glass fibers.

Also thermal properties are better than those of silica glass fibers; these silicon oxycarbide fibers have indeed a higher glass transition temperature, of about 1350° C., compared with about 800° C. of common silica glass fibers.

Possible industrial applications of silicon oxycarbide fibers produced with the method according to the present invention can be in the field of polymer matrix composites, i.e. reinforced plastic composites, where these fibers with high elastic modulus and low costs can be advantageously used as an alternative to common glass fibers.

For high-temperature applications, such as for instance heat insulators, SiCO fibers can be used as an alternative to commercial silica-based fibers, thanks to their high glass transition temperature.

Thanks to the excellent chemical resistance of said silicon oxycarbide fibers, they can be used as reinforcing agents for aggressive materials such as for instance Portland cement.

The polyorganohydrosiloxanes to be used as starting reagents are compounds that are easily available on the market, such as for instance, polymethylhydrosiloxane (PMHS), polyethylhydrosiloxane, methylhydrodmethylsiloxane, methylhydro-phenylmethylsiloxane, methylhydro-octylmethylsiloxane, polyphenyl(dimethylhydrosiloxane) and polymethylhydrosylsesquioxane copolymers. See for instance the catalogue Gelest-Silanes and Silicones, ABCR GmbH & Co. KG, PF 21 01 35, D-76151 Karlsruhe, Germany.

As far as reticulating agents are concerned, these compounds can be chosen among the components of any of the following groups: i) Lewis bases, ii) titanium and zirconium organometallic compounds.

In a less preferred way titanium, zirconium, iron, rhodium, tin and zinc organic or inorganic compounds can be taken into consideration as reticulating agents.

By way of example, as reticulating agents belonging to the group of Lewis bases, the following can be quoted: fluoride ions and hydroxide ions obtained starting from any solution of inorganic bases and dimethylaminopyridine in the framework of solutions of organic bases.

As reticulating agents belonging to the class of organometallic compounds to be used in the present invention, the following can be quoted by way of example: titanium and zirconium alkoxides, carboxylates or beta-diketonates, preferably titanium and zirconium $C_1$-$C_4$ alkoxides, more preferably titanium tetraethoxide.

The composition comprising the silicone polymer and the reticulating agent can be characterized by different concentration ratios of said silicone polymer to said reticulating agent.

For instance, if the reticulating agent is titanium tetraethoxide, the atomic ratio of titanium to silicon can be of 0.01-0.1, and can preferably have the following values: 0.01, 0.03, 0.05, 0.07 and 0.1.

If the reticulating agent comprises fluoride ions in the form of potassium fluoride in aqueous solution, the molar ratio water/PMHS can be of 35-8.75 and can preferably have the values 35, 17.5 and 8.75.

Said composition referred to as reticulated thermoplastic or thermosetting polymer becomes spinnable after about 20-40 hours, preferably 25-35 hours, still more preferably 29-32 hours.

The spinning step can be carried out by means of an extruder, following criteria that are deemed to be basically known.

The time lapse during which the reticulated thermoplastic polymer can be spun depends on the conditions under which it is kept. In a lab spinning lapse is of about 20-40 minutes, generally 30 minutes, because said reticulated thermoplastic polymer is always in contact with air and therefore atmospheric humidity goes on spreading into the solution and accelerates reticulation until the system is no more spinnable.

The fiber pyrolysis step can be carried out under different conditions. Heating temperature can vary from 800 to 1400° C., preferably a temperature between 1000 and 1200° C. is used. Heating rate, which can be of 1, 2, 5, 10, 20 or 50° C./minute, and the composition of the non-oxidizing atmosphere used, which can be vacuum, or a gas chosen from the group comprising argon, nitrogen, helium, hydrogen or mixtures thereof, can vary.

In particular, if the reticulating agent consists of fluoride ions ($F^-$) in aqueous solution and production conditions are the following:
concentration of fluoride ions of $[F^-]=0.05M$,
molar ratio water/polyorganohydrosiloxane $r_H=35$,
mixing/reaction temperature and time respectively of 40° C. and 30 minutes,
solution concentration by solvent distillation up to ideal viscosity so as to obtain the fibers, and
pyrolysis carried out at 1000° C., the chemical composition of the fiber is $SiC_{0.25}O_{1.47}+0.285C$; if pyrolysis is carried out at 1400° C. the resulting composition is $SiC_{0.28}O_{1.44}+0.280C$. By varying the molar ratio $r_H$ from 35 to 8.75 and by keeping the other production conditions unchanged, the fiber has a composition $SiC_{0.275}O_{1.45}+0.245C$; if pyrolysis is carried out at 1400° C. the resulting composition is $SiC_{0.275}O_{1.45}+0.285C$.

If titanium tetraethoxide with an atomic ratio TI/Si=0.05 is used as reticulating agent, the composition of the fibers is $SiC_{1.553}O_{1.741}H_{4.1783}Ti_{0.0554}$ if just spun and $SiC_{0.775}O_{1.355}H_{0.37}Ti_{0.04352}+0.39C$ after carrying out the pyrolysis step at 1000° C. for 1 hour under argon stream and with an estimated composition expressed as phases of $0.33SiC$, $0.67SiO_2$, $0.04TiC$ and $0.39C$.

EXAMPLE 1

Production of SiCO Fibers with a Theoretical Atomic Ratio Ti:Si=0.05:1

10 ml of polymethylhydrosiloxane—(PMHS) with a molecular weight MW=2270 g/mole corresponding to about 35 DH units, trimethyl-terminated (M units)—(corresponding to 9.9 g) are introduced into a beaker and placed under stirring by means of a magnetic anchor. Then the following are added in this order: 1.57 ml of titanium tetraethoxide—Ti(OEt)$_4$—(corresponding to 1.744 g) and 1.76 ml of ethanol (corresponding to 1.408 g). Thus the theoretical atomic ratio Ti:Si is of 0.05. The beaker is then covered with parafilm and the solution is left under stirring for 20-30 min. Eventually, the solution is poured into polypropylene test tubs which are left in contact with the atmosphere.

After 32-33 hours the solution can be spun. Fibers can be obtained manually by immersion of a glass bar into the solution. It is thus possible to produce fibers with a diameter between 10 and 60 microns (FIG. 1).

Figure 2:
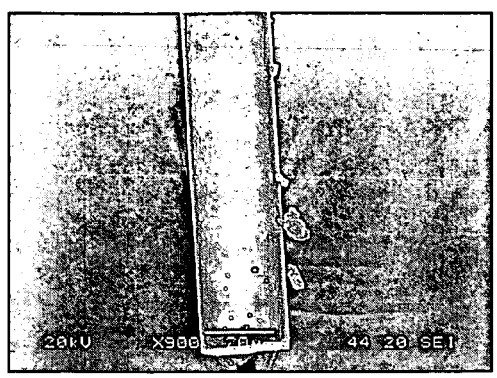
FIG. 2 shows four photographs obtained with a scanning electronic microscope (SEM), with different magnifications, of pyrolyzed ceramic fibers produced with the method described in Example 1.
Figure 2:
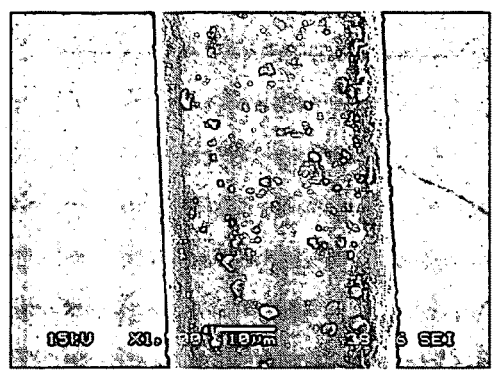
Figure 2:
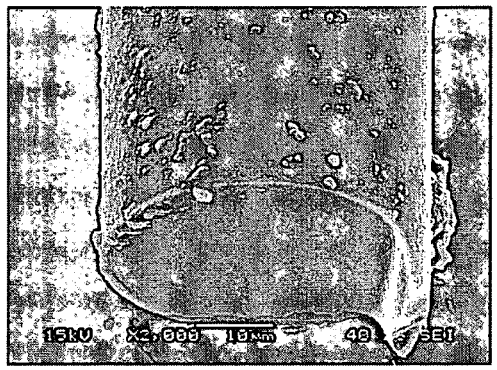
Figure 2:
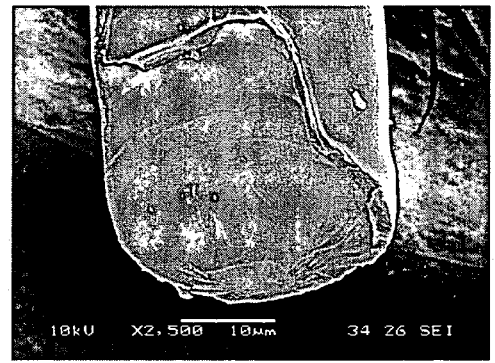

Fibers are dried at 70° C. for 2 hours in an oven and are then pyrolyzed at a temperature between 1000 and 1200° C. for 1 hour at a heating rate varying from 1 to 50° C./min under argon stream (FIG. 2).

Figure 3:
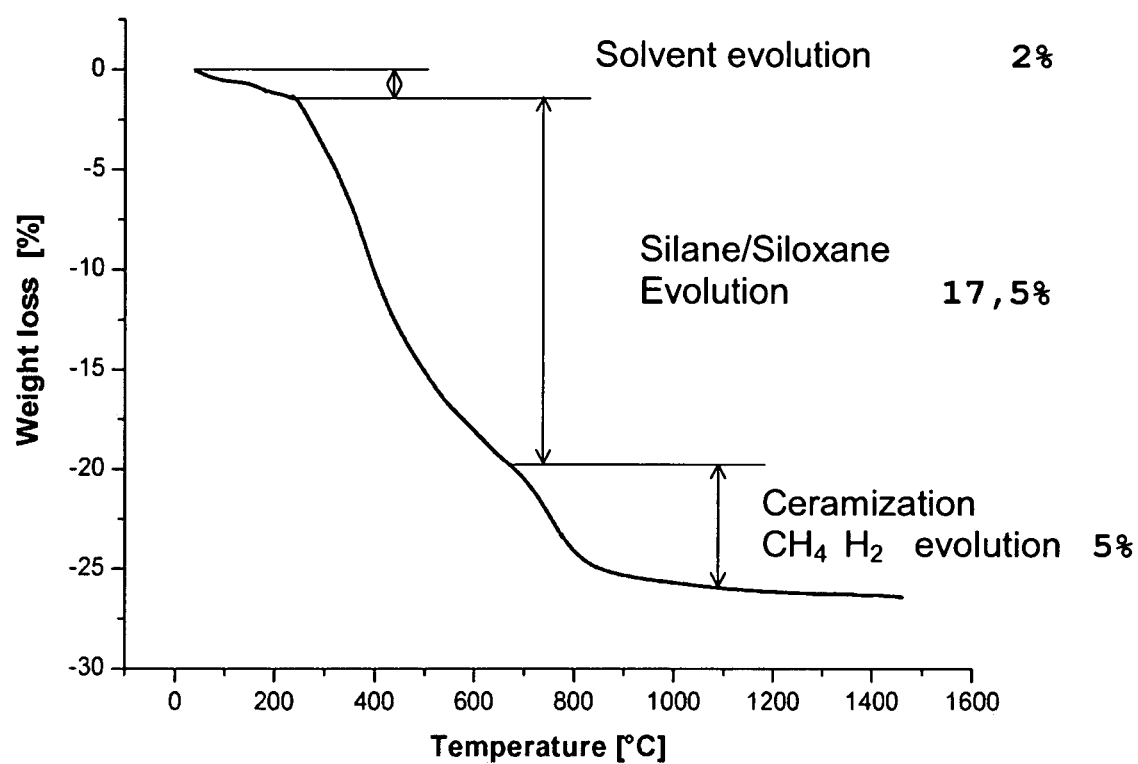
FIG. 3 shows the TGA curve of weight loss as a function of heating temperature of SiCO fibers with Ti/Si ratio=0.05. Heating rate 10° C./min., Ar stream 100 ml/min.
Figure 4:
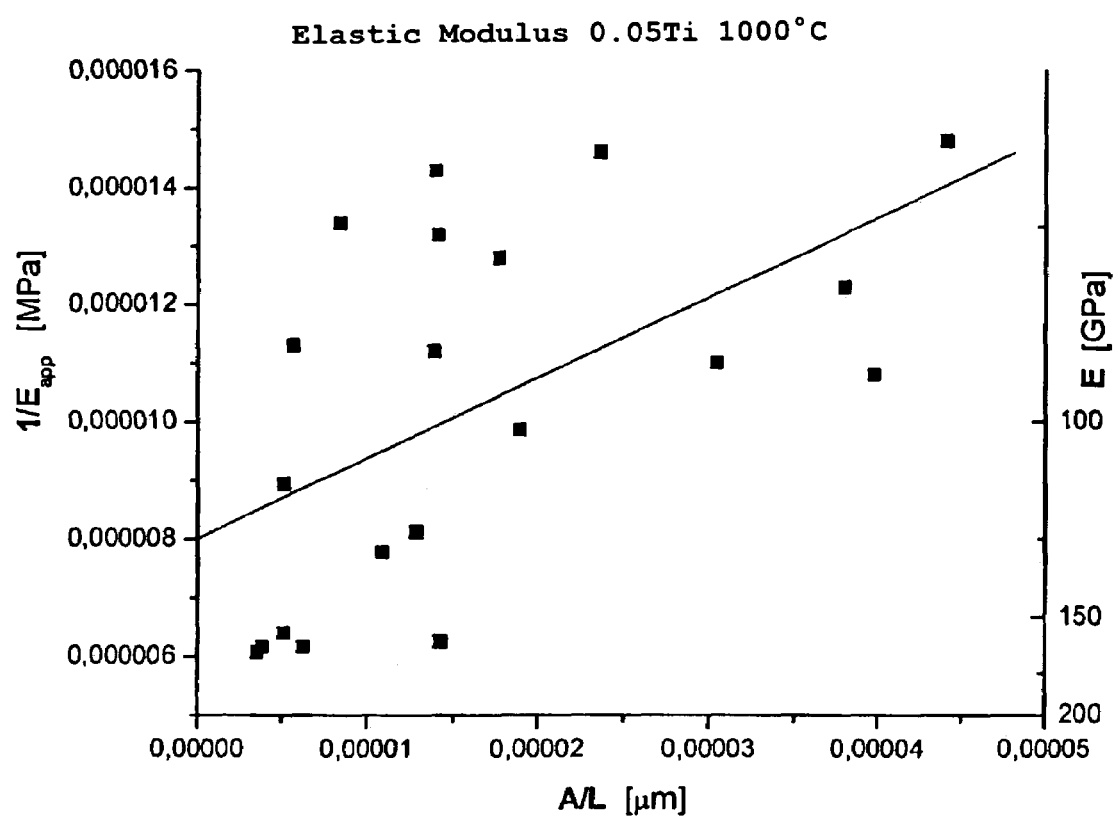
FIG. 4 shows the graph $1/E_{app}$ as a function of A/L ratio of SiCO fibers with Ti/Si ratio=0.05 treated in Ar atmosphere at 1000° C. for 1 hour.
Figure 5:
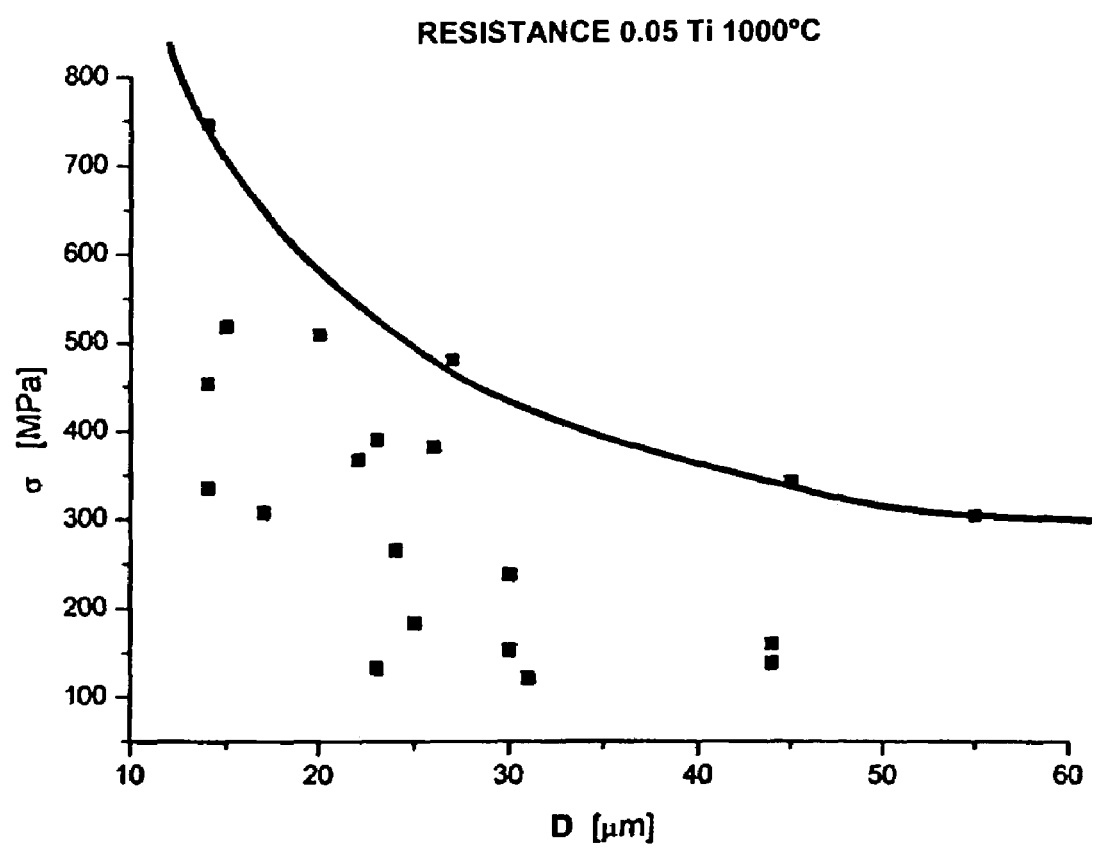
FIG. 5 shows the graph of tensile strength σ as a function of obtained diameter D of SiCO fibers with Ti/Si ratio=0.03 treated in Ar atmosphere at 1000° C. for 1 hour.
Figure 6:
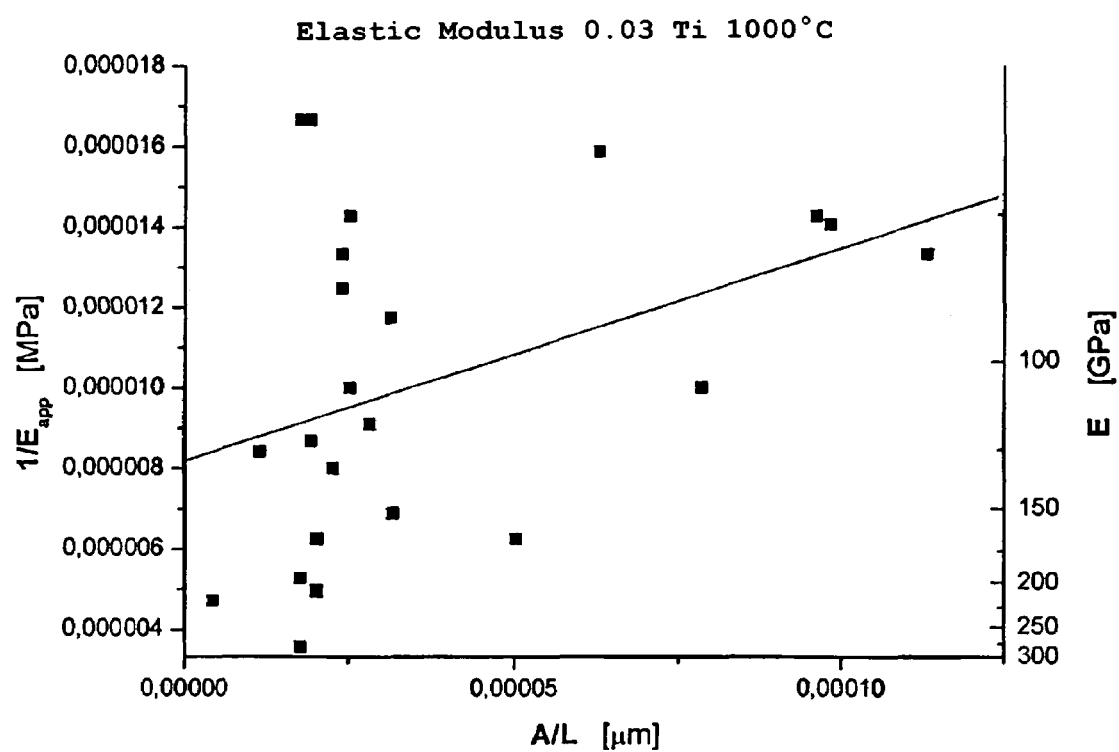
FIG. 6 shows the graph $1/E_{app}$ as a function of A/L ratio of SiCO fibers with Ti/Si ratio=0.03 treated in Ar atmosphere at 1000° C. for 1 hour.
Figure 7:
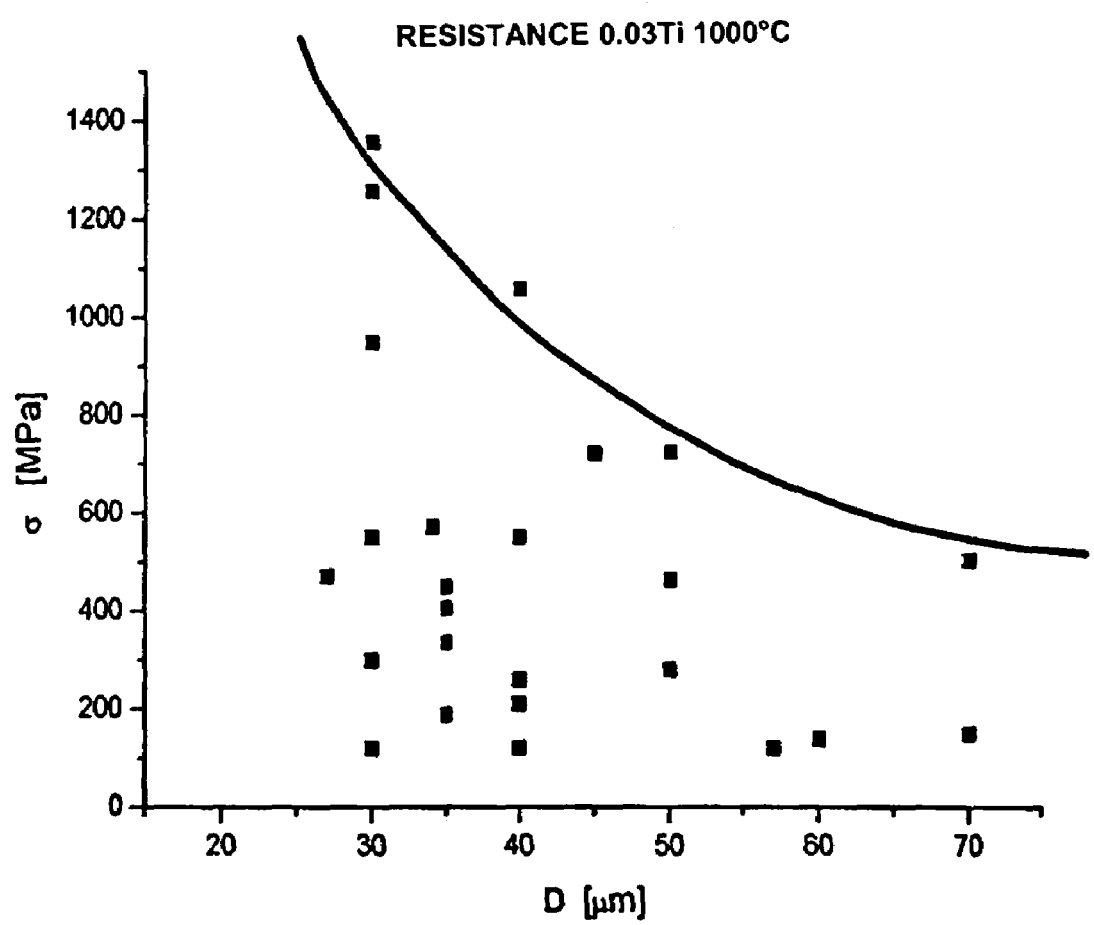
FIG. 7 shows the graph of tensile strength σ as a function of obtained diameter D of SiCO fibers with Ti/Si ratio=0.03 treated in Ar atmosphere at 1000° C. for 1 hour.

During the pyrolysis process it can be observed (FIG. 3) that while temperature rises there is a first relevant weight loss (corresponding to around 17%) in the temperature range from 300 to 650° C. This weight loss is due to the evolution of molecular species such as silanes ($SiH_4$, $SiH_3CH_3$) and siloxanes (($CH_3$)$_3$Si—O—Si ($CH_3$)$_3$) generated by exchange reactions between Si—O bonds and Si—H or Si—C bonds. A second weight loss corresponding to 5% can be seen between 650 and 900° C. This effect is due to the evolution of methane and hydrogen produced by ceramization reactions.

EXAMPLE 2

Production of SiCO Fibers with a Theoretical Atomic Ratio Ti:Si=0.03:1

10 ml of PMHS (corresponding to 9.9 g) are introduced into a beaker and placed under stirring by means of a magnetic anchor. Then the following are added in this order: 0.94 ml of Ti(OEt)$_4$ (corresponding to 1.406 g) and 1.76 ml of ethanol (corresponding to 1.408 g). Thus the theoretical atomic ratio Ti:Si is of 0.03. The beaker is then covered with parafilm and the solution is left under stirring for 20-30 min. Eventually, the solution is poured into polypropylene test tubs which are left in contact with the atmosphere.

After 30 hours the solution can be spun. Fibers can be obtained manually by immersion of a glass bar into the solution. It is thus possible to produce fibers with a diameter between 10 and 60 microns.

Fibers are dried at 70° C. for 2 hours in an oven and are then pyrolyzed at a temperature between 1000 and 1200° C. for 1 hour at a heating rate varying from 1 to 50° C./min under argon stream.

EXAMPLE 3

Production of SiCO Fibers with Potassium Fluoride (KF) 0.05 M and $r_H=35$ 22.7 g of PMHS are dissolved in 84 g of tetrahydrofuran—THF—and the solution is added with 6.3 g of aqueous solution of potassium fluoride 0.05 M ($r_H=35$). The solution is heated to a temperature of 60° C. and is left under stirring at reaction temperature for 30 minutes. The solution is then concentrated by solvent distillation (b.p.=66° C.) until the solution becomes spinnable.

The solution is then cooled down to room temperature and fibers can be obtained by immersion of a glass bar into the solution.

Fibers are dried at 70° C. for 2 hours in an oven and are then pyrolyzed at a temperature between 1000 and 1200° C. for 1 hour at a heating rate varying from 1 to 20° C./min under argon stream.

EXAMPLE 4

Mechanical Characterization of SiCO Fibers.

The mechanical characterization has been carried out with an Instron mechanical test machine equipped with a load cell of 100 Newton.

The fibers have been applied (by means of epoxy glue) onto paper frames with a length between 10 and 50 mm.

Tensile strength tests have been carried out with a cross shifting speed of 10 mm/min.

For calculating tensile strength σ (MPa), the maximum load, F (MN), has been divided by the area of the fiber cross section, A (m$^2$). Fiber diameter has been measured before the mechanical test by means of an optical microscope equipped with a graduated scale. When possible, fiber diameter has also been measured with a scanning electronic microscope SEM on the sample portion remaining after the tensile test.

The apparent elastic modulus of the fibers, $E_{app}$ (GPa), has been calculated on the basis of the cross shifting of the mechanical test machine. So as to consider false deformations, the actual elastic modulus has been calculated by making a diagram of $1/E_{app}$ as a function of $A/L_0$ where:

$E_{app}$ = apparent elastic modulus
A = area of fiber cross section
$L_0$ = initial length As a matter of fact, the total deformation measured ($\Delta L_{tot}$) is given by the sum of two components, the deformation of the measuring instrument ($\Delta L_{strum}$), and the deformation of the sample ($\Delta L_f$):

$$\Delta L_{tot} = \Delta L_{strum} + \Delta L_f \quad (1)$$

Instrumental deformation is proportional to applied load (F) through $K_{strum}$ constant:

$$\Delta L_{strum} = K_{strum} F$$

whereas fiber deformation depends on tensile strength or stress (σ), on fiber elastic modulus, $E_f$, and on initial fiber length:

$$\Delta L_f = L_0 \sigma / E_f$$

This results in:

$$E_{app} = \sigma / (\Delta L_{tot}/L_0) \quad (2)$$

where $E_{app}$ is apparent elastic modulus considering total deformation. By replacing in (2) the expression (1) the following is obtained:

$$E_{app} = \sigma / ((\Delta L_{strum} + \Delta L_f)/L_0) \quad (3)$$

i.e.:

$$E_{app} = \sigma / (\Delta L_{strum}/L_0 + \Delta L_f/L_0) \quad (4)$$

Considering the inverse of (4):

$$1/E_{app} = (\Delta L_{strum}/L_0)/\sigma + (\Delta L_f/L_0)/\sigma \quad (5)$$

But: σ=F/A and therefore $$(\Delta L_{strum}/L_0)/\sigma = (\Delta L_{strum}/L_0)/(F/A)$$

and re-arranging:

$$(\Delta L_{strum}/L_0)/\sigma = (\Delta L_{strum}/F)(A/L_0) \quad (6)$$

As previously seen, $\Delta L_{strum}/F = K_{strum}$ and therefore, by replacing in (6) the following is obtained:

$$(\Delta L_{strum}/L_0)/\sigma = K_{strum}(A/L_0) \quad (7)$$

By replacing (7) in (5) and observing that $(\Delta L_f/L_0)/\sigma = 1/E_f$ the following is eventually obtained:

$$1/E_{app} = K_{strum}(A/L_0) + 1/E_f \quad (8)$$

So that, by making a diagram of $1/E_{app}$ as a function of $A/L_0$ a line with gradient $1/K_{strum}$ should be obtained, and by extrapolating to zero the fiber elastic modulus is obtained as intercept of y axis.

Some typical graphs concerning tensile strength and elastic modulus are shown in FIGS. 4-7.

Tensile strength (FIGS. 5 and 7) follows the typical course of glass fibers, in which strength value rises while fiber diameter decreases.

As far as elastic modulus (FIGS. 4 and 6) is concerned, its value can by calculated by extrapolating to zero the interpolating line in diagram $1/E_{app}$ vs $A/L_0$ and by measuring intercept value for $A/L_0=0$.

Tables 1 and 2 show values referring to tensile strength and elastic modulus of silicon oxycarbide fibers produced according to the method described in Examples 1 and 2 respectively.

TABLE 1

Mechanical properties of SiCO fibers produced according to the method described in Example 1 (Ti/Si ratio = 0.05)

| Pyrolysis temp. (° C.) | σ (MPa) (max. value) | Ea (GPa) |
|---|---|---|
| 1000 | 850 | 120 |
| 1100 | 1100 | 150 |
| 1200 | 600 | 180 |

TABLE 2

Mechanical properties of SiCO fibers produced according to the method described in Example 2 (Ti/Si ratio = 0.03)

| Pyrolysis temp. (° C.) | σ (MPa) (max. value) | Ea (GPa) |
|---|---|---|
| 1000 | 1250 | 115 |
| 1100 | 600 | 155 |

EXAMPLE 5

Chemical Characterization of SiCO Fibers

The chemical resistance of SiCO fibers has been evaluated by immersing SiCO fibers produced according to the method described in Example 1 with pyrolysis temperature at 1000° C. and commercially available glass fibers E into a strongly basic or acid solution and observing, after said treatment, fiber appearance by means of a scanning electronic microscope (SEM).

For the test in basic environment a solution containing 0.5M $Na_2CO_3$ and 1M NaOH in vol: ratio 1/1 has been used; according to norm ISO695 the fibers have been left in the solution for 2 hours at 80° C.

Figure 8:
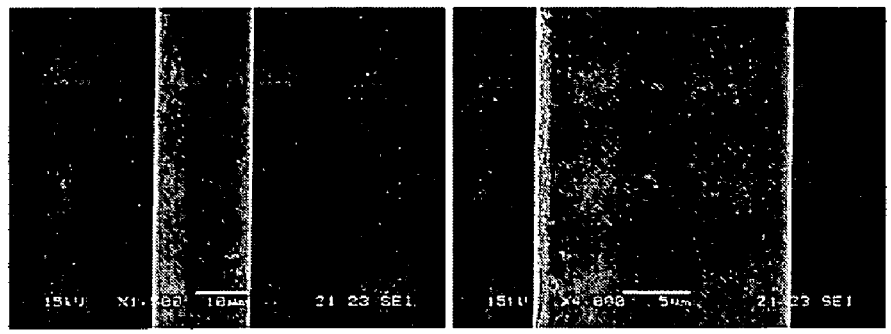
FIG. 8 shows two photographs obtained with a scanning electronic microscope (SEM), with different magnifications, of SiCO fibers produced with the method described in Example 1 after immersion in basic solution.
Figure 9:
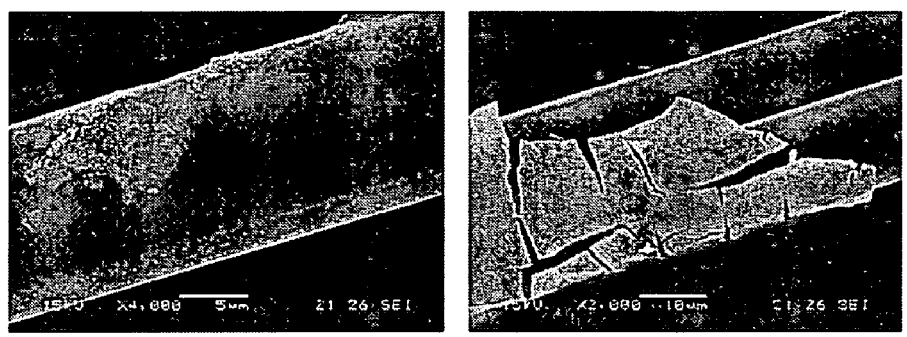
FIG. 9 shows two photographs obtained with a scanning electronic microscope (SEM), with different magnifications, of glass fibers E after immersion in basic solution.

SiCO fibers (FIG. 8) do not show any surface defeat due to corrosion caused by the basic solution. Conversely, common glass fibers E (FIG. 9) are strongly corroded.

In order to evaluate resistance in acid environment, an aqueous solution with 5% by volume of hydrofluoric acid (HF) has been used, into which fibers have been immersed for 15 minutes at room temperature under stirring.

Figure 10:
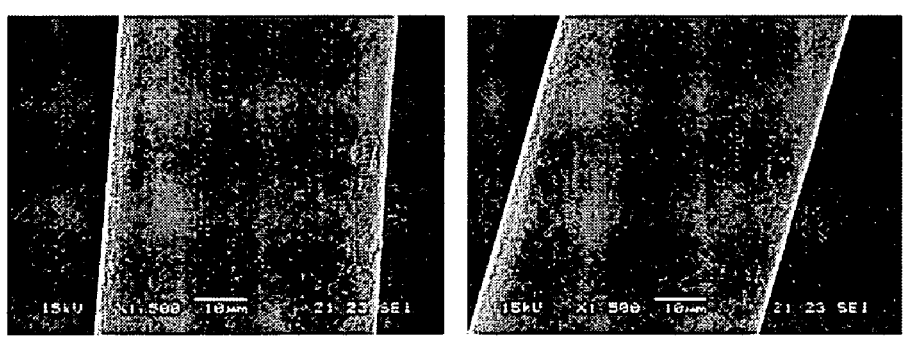
FIG. 10 shows two photographs obtained with a scanning electronic microscope (SEM), with different magnifications, of SiCO fibers produced with the method described in Example 1 after immersion in acid solution.

SiCO fibers have not been attacked by HF (FIG. 10), whereas common glass fibers E have been completely dissolved.

Obviously, the quantitative values referred to up to now should be understood by considering intrinsic tolerances related both to their obtainment and to the their measurement.

The invention claimed is:

1. A method for producing silicon oxycarbide ceramic fibers comprising the following steps:
   i) spinning of a composition comprising a silicone polymer and a reticulating agent,
   ii) reticulation of fibers obtained from step i), and
   iii) pyrolysis of said reticulated fibers at a temperature between 800 and 1400° C. in non-oxidizing atmosphere,
   wherein the silicone polymer is a polyorganohydrosiloxane and the reticulating agent carries out reticulation by reading with Si—H bonds of polyorganohydrosiloxane, and wherein the reticulating agent is chosen from the group comprising titanium or zirconium organometallic compounds, titanium, zirconium, iron rhodium, tin or zinc inorganic compounds, and combinations thereof.

2. Method according to claim 1, wherein the polyorganohydrosiloxane is polymethylhydrosiloxane.

3. Method according to claim 1, wherein the reticulating agent is chosen from the group consisting of titanium or zirconium organometallic compounds.

4. Method according to claim 3, wherein the reticulating agent is selected from the group consisting of titanium or zirconium alkoxides, carboxylates or betadiketonates and combinations thereof.

5. Method according to claim 4, wherein the reticulating agent is selected from the group consisting of titanium or zirconium alkoxides and combinations thereof.

6. Method according to claim 5, wherein the reticulating agent is titanium tetra-ethoxide.

7. Method according to claim 6, wherein the atomic ratio Ti/Si of titanium tetra-ethoxide to polyorganohydrosiloxane is of 0.01-0.1.

8. Method according to claim 7, wherein the atomic ratio Ti/Si of titanium tetra-ethoxide to polyorganohydrosiloxane is 0.01, 0.03, 0.05, 0.07, or 0.1.

9. Method according to claim 1, wherein the reticulating agent is selected from the group consisting of titanium, zirconium, iron, rhodium, tin and zinc in-organic compounds, and combinations thereof.

10. Method according to claim 1, wherein the time required for the composition of silicone polymer and reticulating agent to become spinnable is of about 20-40 hours, preferably 25-35 hours.

11. Method according to claim 10, wherein the time required for the composition of silicone polymer and reticulating agent to become spinnable is of about 25-35 hours.

12. Method according to claim 10, wherein the time required for the composition of silicone polymer and reticulating agent to become spinnable is of about 29-32 hours.

13. Method according to claim 1, wherein the heating rate during the pyrolysis step is of 1-50° C./min.

14. Method according to claim 13, wherein the heating rate during the pyrolysis step is 1, 2, 5, 10, 20, or 50° C./min.

15. Method according to claim 1, wherein the non-oxidizing atmosphere in the pyrolysis step is vacuum or a gas, said gas being selected from the group consisting of argon, nitrogen, helium, hydrogen or mixtures thereof.

16. Method according to claim 1, wherein the fibers produced in the spinning step i) have a diameter of 10-60 µm.

17. Method according to claim 1, wherein the amount of reticulating agent is chosen so that said ceramic fibers have an elastic modulus of 120 to 180 GPa.

* * * * *